United States Patent
Hackl et al.

Patent Number: 6,110,513
Date of Patent: Aug. 29, 2000

[54] METHOD OF CURING PICKLE STOCK

[75] Inventors: Craig Hackl, Rockford, Ill.; Ted Koelling, Green Bay, Wis.

[73] Assignee: Dean Foods Co., Franklin Park, Ill.

[21] Appl. No.: 08/075,740

[22] Filed: Jun. 11, 1993

[51] Int. Cl.[7] ............... A23B 7/00; A23B 7/05; A23B 7/08

[52] U.S. Cl. ........... 426/281; 426/419; 426/615; 426/638; 426/639

[58] Field of Search ............ 426/281, 615, 426/638, 639, 419

[56] References Cited

U.S. PATENT DOCUMENTS

| | | |
|---|---|---|
| 1,890,475 | 12/1932 | Todd ............ 426/615 |
| 2,291,704 | 8/1942 | Fisher ............ 426/615 |
| 3,843,810 | 10/1974 | Fehmerling . |
| 4,557,937 | 12/1985 | Bournier . |
| 4,735,813 | 4/1988 | Spinoglio . |
| 4,789,558 | 12/1988 | Winkler et al. . |

*Primary Examiner*—Curtis E Sherrer
*Attorney, Agent, or Firm*—Flynn, Thiel, Boutell & Tanis, P.C.

[57] ABSTRACT

A method for obtaining a cured pickle stock without subjecting the pickle stock to conventional fermentation processes. The pickle stock is immersed in a curing liquid and then subjected to alternative vacuum and pressure treatment steps. A cured pickle product is produced having the desired translucent appearance.

5 Claims, 5 Drawing Sheets

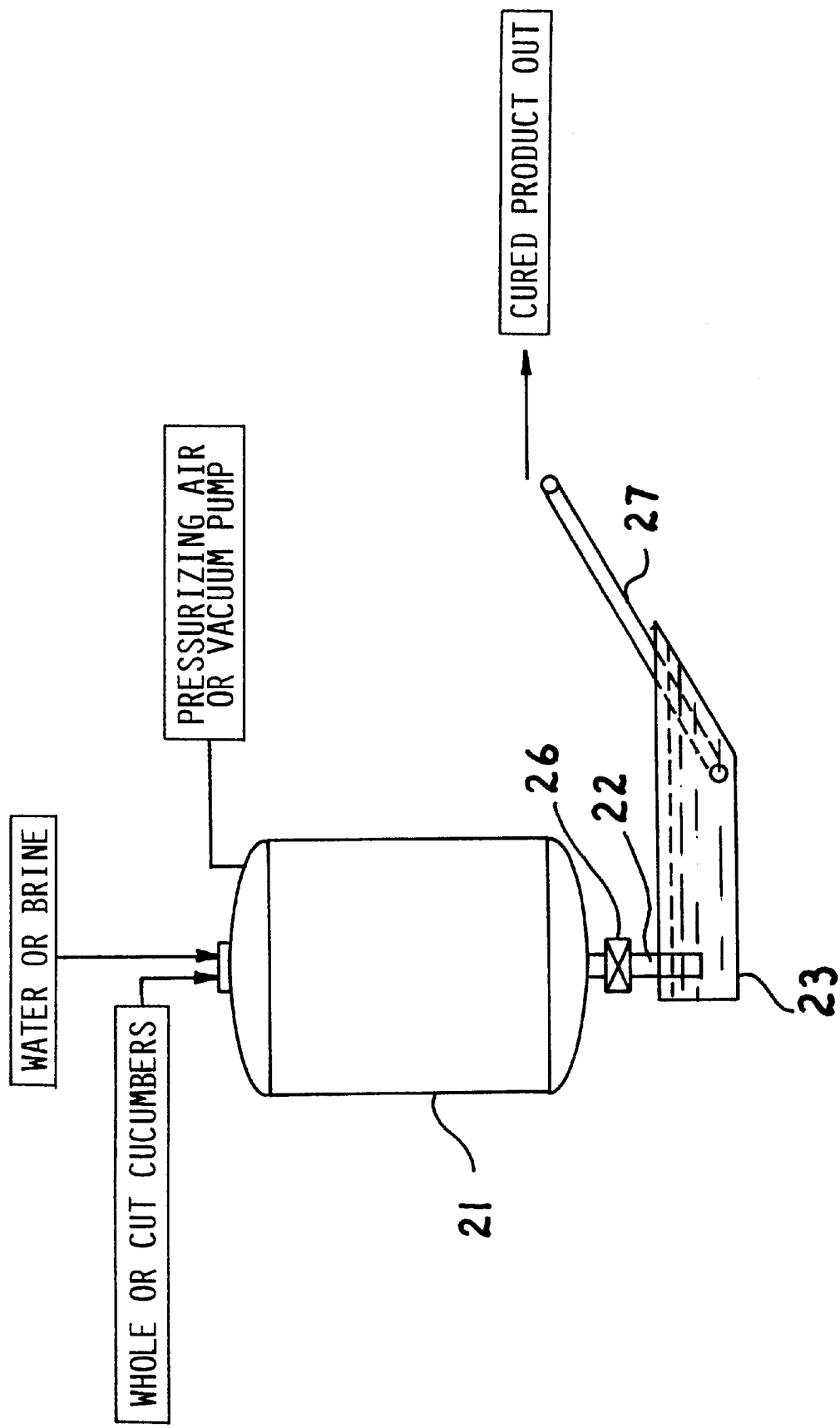

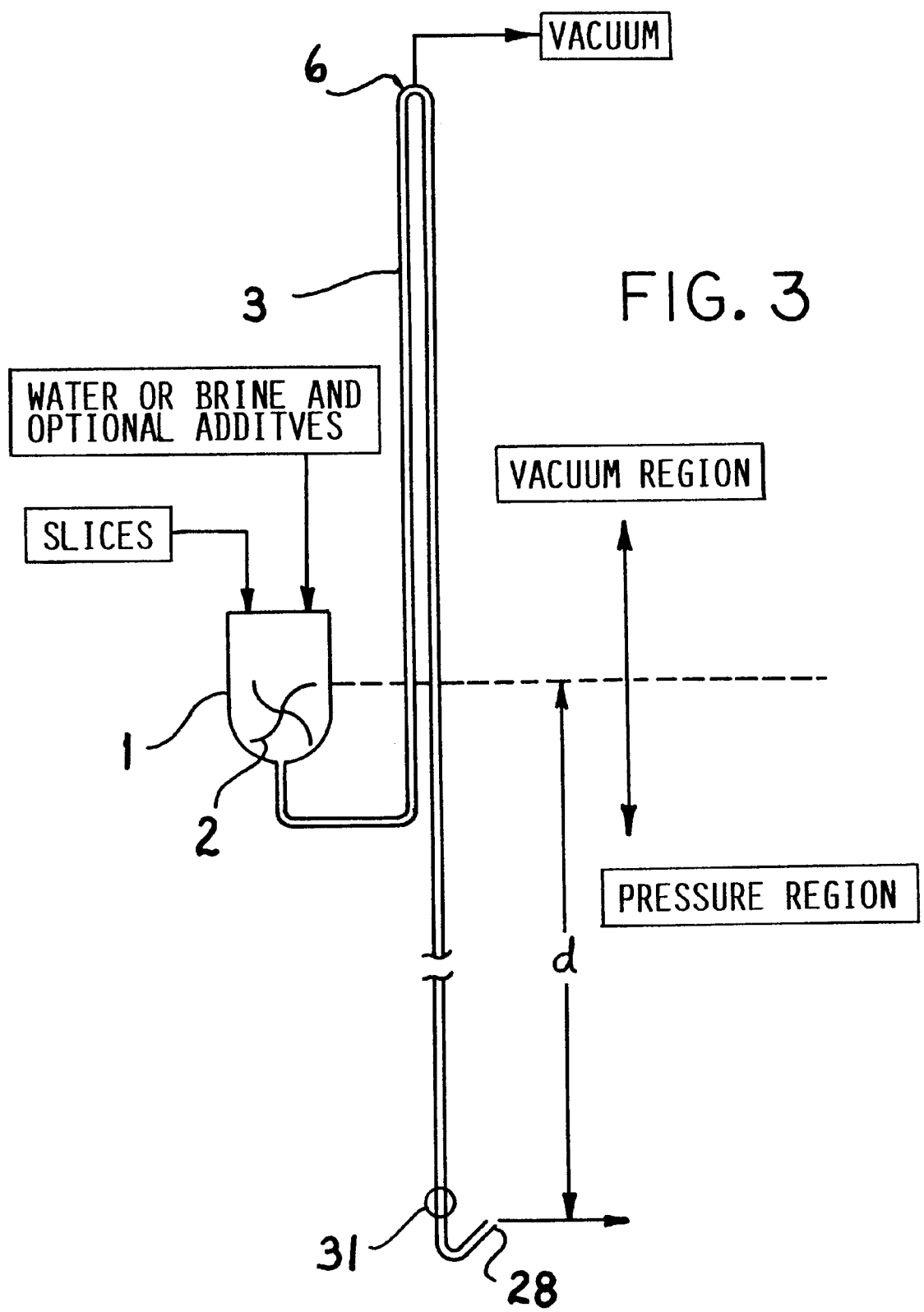

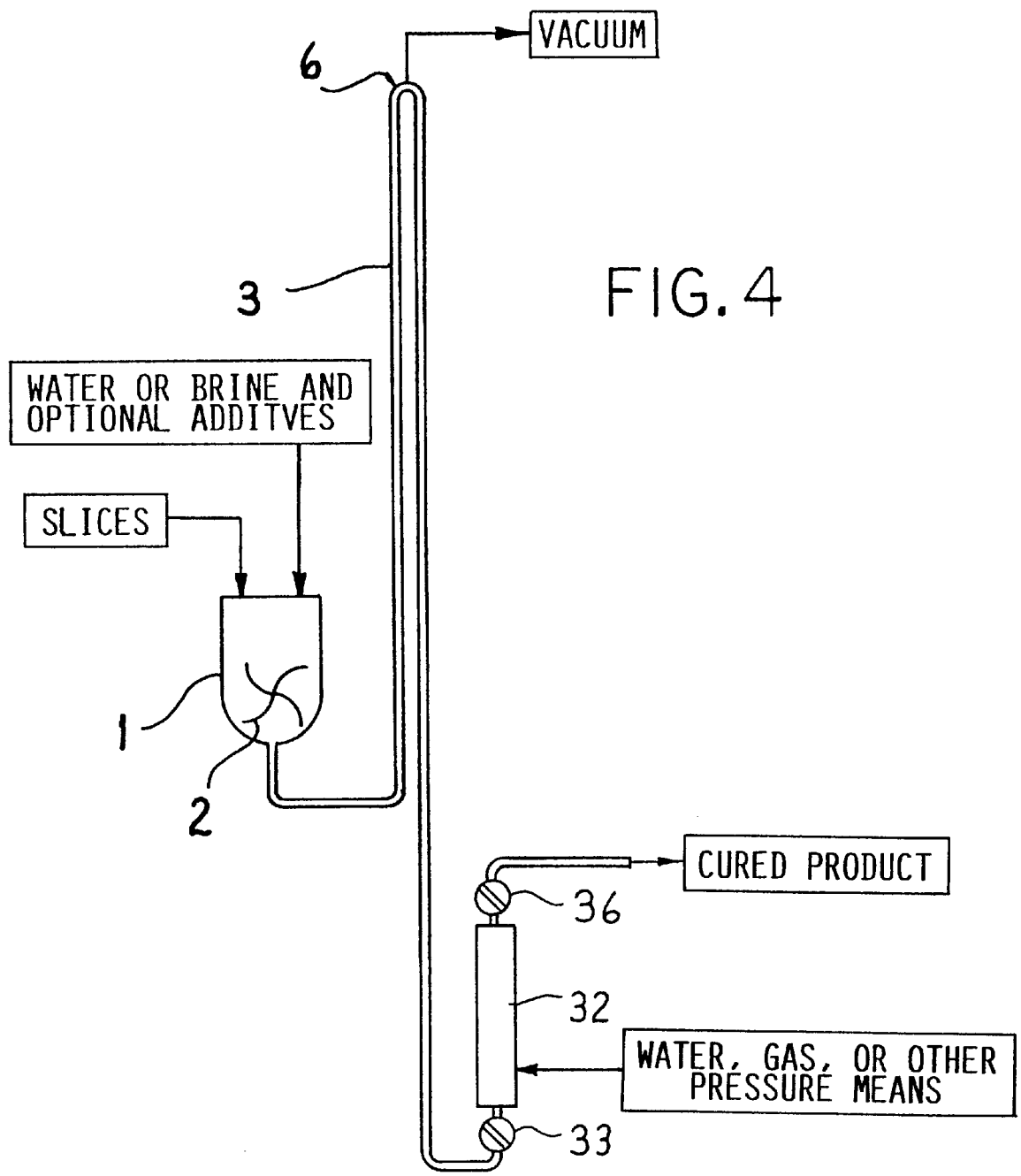

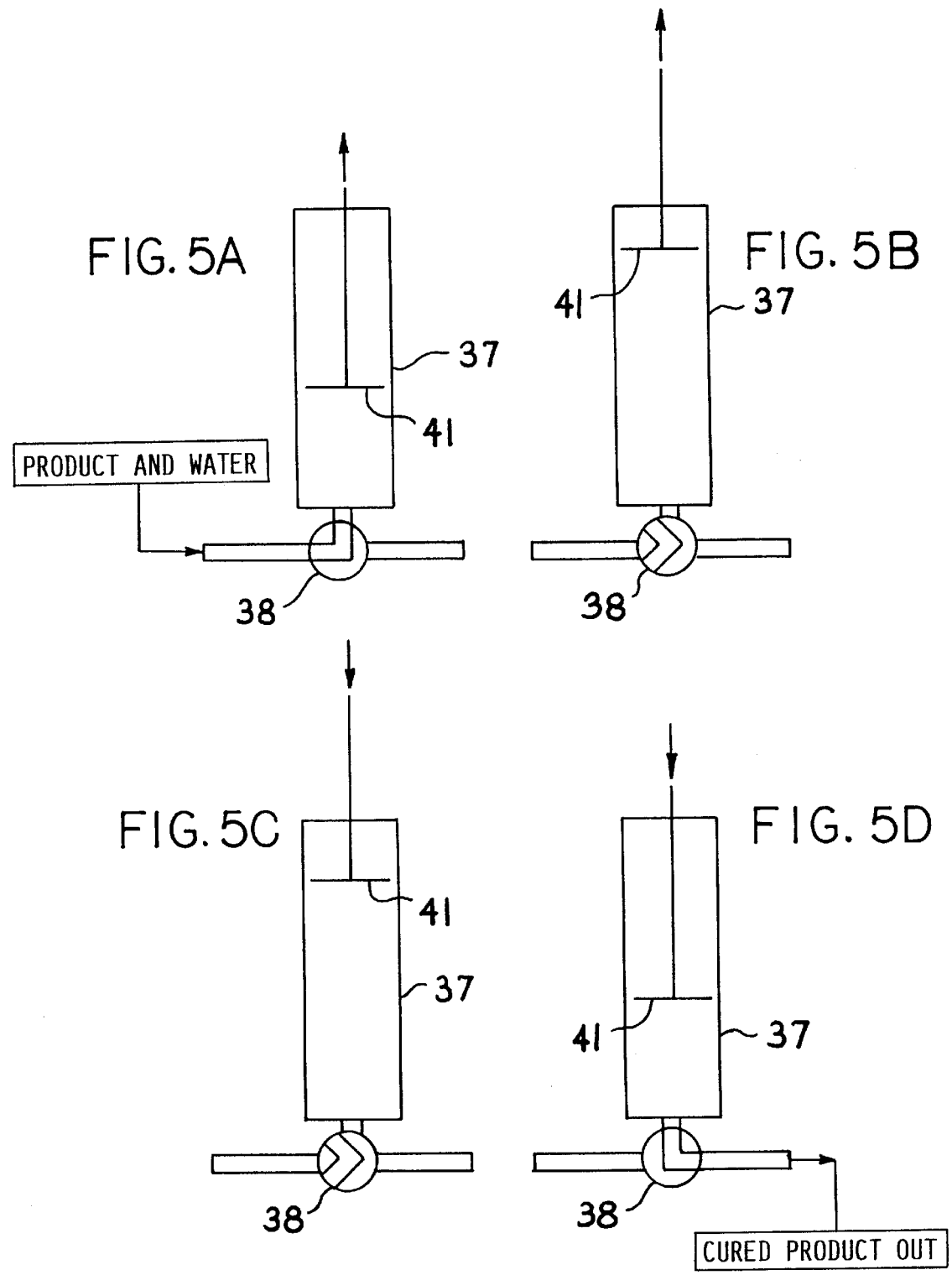

METHOD OF CURING PICKLE STOCK

BACKGROUND OF THE INVENTION

1. Field of the Invention

The present invention is directed to a method of producing a cured pickle product. More particularly, the present invention is directed to a method for producing a cured pickle product without the necessity of a traditional fermentation step.

2. Description of the Prior Art

Cured pickle products are very popular with consumers all over the world because they typically have a flavor and an appearance that clearly distinguishes them from other types of pickle products, such as "fresh pack".

The traditional method of curing a pickle stock, such as cucumbers, peppers or other vegetables, typically requires the fermentation of the pickle stock. These traditional fermentation processes require that the raw pickle stock be placed in a vat or other suitable container containing a brine curing solution and stored in this brine curing solution for a period of time sufficient for fermentation to take place and produce a cured product. Traditional fermentation processes can take from three to four weeks to produce a cured product and require many large storage tanks to accommodate a pickle stock crop such as cucumbers. Tank yard operations in the traditional fermentation processes involve a considerable amount of labor and capital expenditure with respect to running and maintaining the tank yard. Disposal of the spent brine raises additional problems since many municipalities have ordinances regulating chloride discharge. Manufacturers have attempted to reduce the amount of chloride discharge by reducing the fermentation salt levels, recycling spent pickling brine and attempting to prevent tank leakage. However, these steps do not solve but merely delay the problem of disposing of the large volumes of dilute salt brine generated.

In addition to the problems discussed above, traditional fermentation processes also suffer from factors which result in inconsistent or poor quality product and loss of yield. These factors include "softening" of the pickle stock; slow, no, or wrong fermentation; bloating and other gaseous defects; physical handling damage; incomplete curing appearance; and freeze damage in cold climates.

In order to overcome the above-discussed problems, U.S. Pat. No. 4,844,929 discloses a one-step nonfermentative pickling process in which a pickle stock is placed in a solution containing pickling powders made up of acidulants, spices, flavors and certain chloride and calcium salts and stored therein for a period of time of from 3 to 10 days to produce a pickled product.

U.S. Pat. No. 4,883,679 discloses a brine used for conserving cucumbers in bulk which contains sodium chloride, acetic or lactic acid or a nontoxic salt thereof, sodium benzoate, calcium chloride, potassium sorbate, ascorbic acid and citric acid. The cucumbers stored in this brine are stated to have a taste and crispiness equal to that of fresh pack cucumbers.

U.S. Pat. No. 4,789,558 discloses a method for producing sweet pickles in which a pickle stock having its outer membrane perforated is immersed in a calcium chloride brine, subjected to vacuum and pressure treatment steps and then allowed to equilibrate in a high sugar syrup.

However, none of the above discussed references describe or disclose a process for producing a cured pickle stock according to that of the present invention.

SUMMARY OF THE INVENTION

It is an object of the present invention to provide a method of producing a cured pickle product.

It is another object of the present invention to provide a method of making a cured pickle product in which traditional fermentation steps can be eliminated.

It is yet another object of the present invention to provide a method of producing a cured pickle product in which a pickle stock is immersed in a curing liquid and then subjected to alternative vacuum and pressure treatment steps.

It is still another object of the present invention to provide a method for making a cured pickle product in which the raw pickle stock is immersed in a curing liquid and then subjected to alternative vacuum and pressure treatment steps for a duration of not more than a minute for each step.

It is a further object of the present invention to provide a method for making a cured pickle product in which the curing of the raw pickle stock takes place in a curing liquid consisting essentially of water.

These objects of the present invention, as well as other objects which would be apparent to those of ordinary skill in the art, are illustrated in the following discussion of the present invention.

BRIEF DESCRIPTION OF THE DRAWINGS

FIG. 2 illustrates a batch process according to the present invention;

FIG. 3 illustrates an embodiment of the present invention particularly useful in the curing of sliced pickle stock or relish;

FIG. 4 illustrates the embodiment of FIG. 3 wherein a pressure chamber is used to replace the barometric leg; and FIGS. 5A–D illustrate an embodiment of the present invention in which a piston pump is used to perform the process steps.

DETAILED DESCRIPTION OF THE INVENTION

Figure 1:
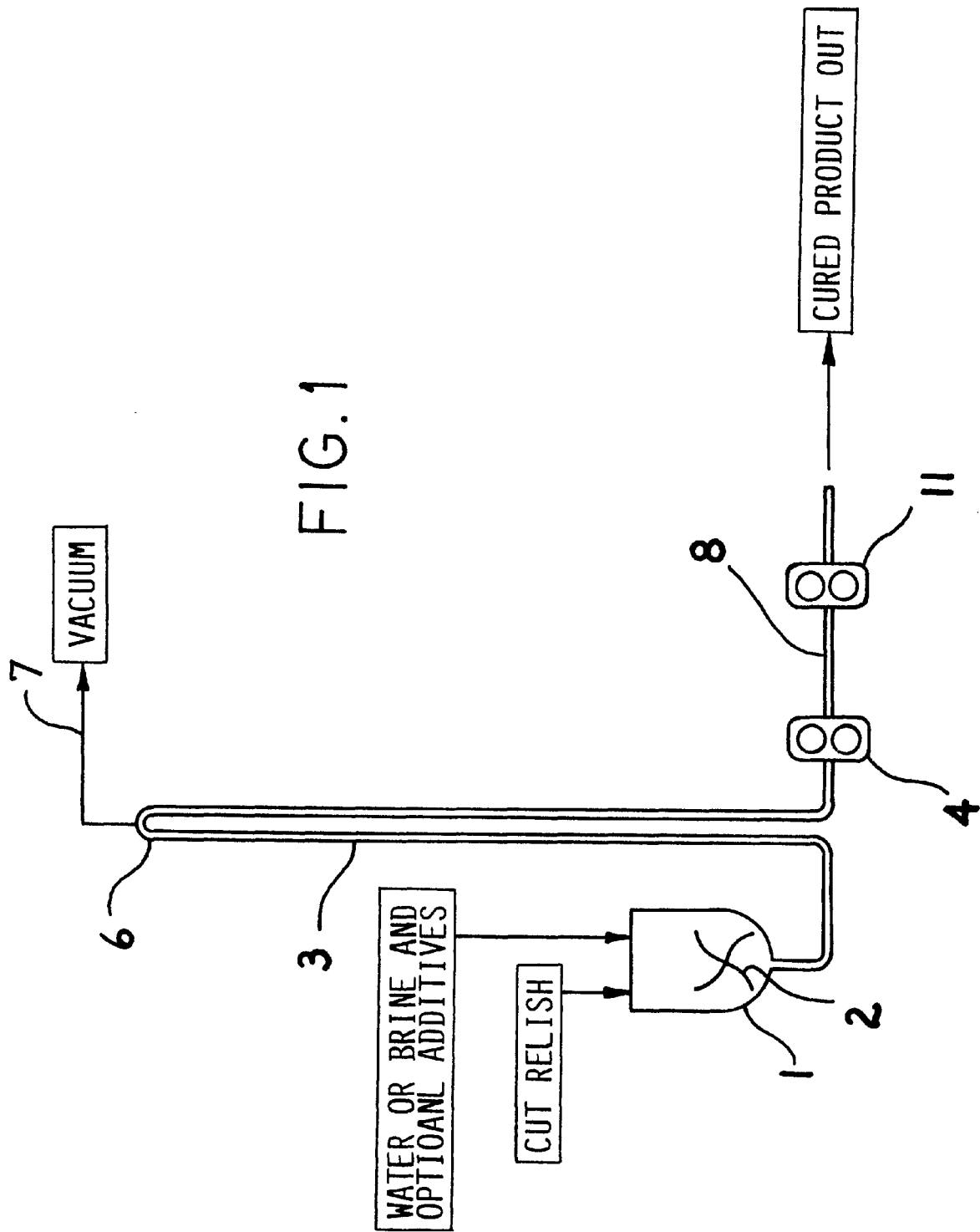
FIG. 1 illustrates a continuous process according to the present invention.

The present invention is based on the discovery that a cured pickle product can be prepared without traditional fermentation treatment and in a minimum amount of time by submerging a pickle stock in a curing solution and then subjecting the pickle stock to alternative vacuum and pressure treatment steps. The pickle stock used in the present invention may be whole, sliced or diced in the form of a relish. The pickle stock can be cucumbers, peppers or any other food stock which is typically cured by fermentation.

In the present invention, the raw pickle stock is introduced into and immersed in a curing liquid. The curing liquid used in the present invention is not critical and can be water, sweetener solutions, vinegar, brine-containing solutions and mixtures thereof. When whole cucumbers are used as the pickle stock, it is advantageous to break the skin of the cucumbers by cutting, slashing or pricking in order to enhance the curing thereof by the method of the present invention. Additionally, the present process is not limited to raw pickle stock. Pickle stock which has undergone traditional salt fermentation, which has not finished complete fermentation, which has been stored in a special storage brine or which has been stored in refrigerated water or brine, can be used in the inventive process alone and in combination with fresh pickle stock.

After the pickle stock is immersed in the curing liquid, the pickle stock is then subjected to a vacuum pretreatment step. It has been found that a vacuum of from zero to 7,000 kilograms per square meter absolute is particularly advantageous in the present invention in terms of expediency. At a vacuum of less than 7,000 kilograms per square meter absolute, a hold time of greater than one minute is unnecessary. In fact, once the desired vacuum level is reached, the vacuum can be released and the pressure treatment step can begin immediately.

Immediately after the release of the vacuum on the immersed pickle stock, the pickle stock is subjected to a pressure treatment step. In the pressure treatment step, the immersed pickle stock is subjected to an overpressure for an amount of time sufficient to effect the cure of the pickle stock. It has been found that the application of a pressure greater than 17,500 kilograms per square meter is particularly desirable. At a pressure of greater than 17,500 kilograms per square meter, the duration of the pressure treatment steps need not be greater than one minute. In fact, once the desired level of pressure has been reached, the pressure can be released and the cured pickle product recovered.

Although only one vacuum and pressure treatment cycle is generally necessary in the present invention, repeated cycles or partial cycles can be applied without detriment to the cured pickle product.

The process of the present invention can be operated as either a continuous or a batch process. In FIG. 1, a continuous process is illustrated. In FIG. 1, the raw pickle stock, such as cut relish, is introduced into a tank 1 along with a sufficient amount of the curing liquid to completely immerse the raw pickle stock. An agitator 2 can be provided in the tank 1 in order to ensure a uniform dispersion of the pickle stock in the curing liquid. The mixture of the pickle stock and the curing liquid is then drawn through a pipe 3 by suction provided from a first positive displacement pump 4 and upwards to the top of pipe loop 6 provided in the pipe 3. At the top of the pipe loop 6, a vacuum line 7 is installed to remove the air from the pipe line upon start up and to evacuate the gases from the raw pickle stock as they are drawn out. Due to the hydraulic effect from the height of the pipeline, a vacuum is obtained at the top of the loop 6. Vacuum levels to 6,000 kilograms per square meter absolute can be achieved by varying the height of the loop between 6 and 10 meters.

The first positive displacement pump draws the mixture from the pipeline and discharges it into a second pipe section 8 provided between the first positive displacement pump 4 and a second positive displacement pump 11. In the second pipe section 8, an overpressure is developed as the result of the restriction in outward flow of the second pump 11. The pressure can be controlled in the second pipe section 8 by regulating the relative pumping rates of the two pumps. After the mixture is discharged from the second pump 11, the cured pickle product is separated from the curing liquid and sent to packaging or subjected to further treatment steps.

FIG. 2 illustrates the process of the present invention operated in a batch mode. This type of process is particularly suitable for whole and large-cut pickle stock.

As illustrated in FIG. 2, the raw pickle stock and the curing liquid are introduced into a pressure-vacuum vessel 21 in relative amounts sufficient to immerse the raw pickle stock in the curing liquid. Generally, the curing liquid is added to the vessel 21 first in order to act as a cushion for the raw pickle stock added thereafter. A curing liquid to raw pickle stock ratio of greater than 1:1 is typical. The pressure-vacuum vessel 21 is capable of withstanding the working pressures and vacuum applied during the treatment step.

After the curing liquid and the raw pickle stock have been introduced into the vessel 21, the vessel is hermetically sealed. A vacuum is then drawn on the vessel, held for the desired period of time and then released. An overpressure is then immediately applied to the vessel, held for the desired period of time and then released to yield the cured pickle product.

The unloading of the pressure-vacuum vessel 21 can be accomplished by pumps or by taking advantage of the hermetic sealing of the vessel. By extending the discharge outlet 22 underneath water provided in an unloading tank 23, air is prevented from entering into the vessel 21 when the discharge valve 26 is opened. The contents of the vessel 21 will not empty as long as the vessel 21 remains hermetically sealed. The introduction of air or liquid through valves (not shown) provided on the vessel body will result in an equal or greater volume of the vessel's contents being displaced and flowing out. By controlling the amount of air or liquid introduced therein, the outflow from the vessel is easily regulated. The cured pickle products can be separated from the liquid in the tank 23 by a draining device 27. This draining device 27 can be a screen, mesh belt or other devices or combination of devices typically used for such a purpose.

FIG. 3 illustrates an embodiment of the present invention that can be used in the curing of a sliced pickle stock or relish. The pickle stock along with the curing liquid is introduced into a mixing tank 1 containing an agitator 2. After a uniform dispersion of the pickle stock in the curing liquid is formed in the mixing tank 1, the dispersion is withdrawn from the mixing tank 1 and discharged from a pipe 3. The pipe 3 has an elevated loop 6 and a discharge 28 which is provided at a lower elevation than the liquid level in the mixing tank 11, thereby enabling the dispersion to be removed from the tank 11 by a "siphon effect." The dispersion is subjected to the maximum amount of vacuum at the top of the loop 6 and the pressure increases as the dispersion moves down in the pipe towards a valve 31. The pressure is hydraulically created by the height of the liquid in the pipe 3 and the rate of flow through the system can be regulated by valve 31. A minimum difference between the heights of the liquid level in the mixing tank 1 and the discharge 28 of "d" equal to about 10 feet is required to adequately pressurize the pickle stock. This embodiment of the present invention eliminates the use of pumps which could severely damage the sliced pickle stock or relish.

In FIG. 4, a small pressure chamber 32 is used in place of the barometric leg of FIG. 3. Both valves 33, 36 at the pressure chamber inlet and outlet are opened to admit the dispersion into the pressure chamber 32. The valves 33, 36 are then closed and the interior of the pressure chamber 32 pressurized by a suitable medium such as water, air, etc. When the pickle stock is deemed to be cured, valves 33, 36 are opened to discharge the cured pickle stock from the pressure chamber 32.

In FIGS. 5A–D, a piston pump 37 is used as the source for both the vacuum and the overpressure, and to also serve as the means for pumping the cured pickle stock. The pickle stock dispersion is introduced into the piston pump 37 through a three-way valve 38. The valve 38 is then closed and a vacuum applied to the dispersion by retracting a piston 41 provided inside the piston pump 37. After a sufficient amount of vacuum is applied to the dispersion, the piston 41 is then extended to pressurize the pickle stock dispersion.

After a sufficient amount of pressure has been applied to the dispersion, three-way valve 38 is opened to allow the cured pickle stock to be discharged from the piston pump 37.

The curing liquid used in the present process may be reused many times or used only once. If the curing liquid is used only once, then the inventive process also constitutes a rinsing step in which reducing sugars and green flavors are removed. The discharge of the curing liquid into a flume for conveying the cured pickle product also constitutes a washing step if the flume of water is refreshed or not completely reused.

The product pickle stock is then packed into finished containers or subjected to additional treatment steps, such as additional sweetening or flavor additions, as desired. Moreover, additional heating of the finished product may also be required, depending on the style of the finished product being manufactured.

Although a particular preferred embodiment of the invention has been disclosed in detail for illustrative purposes, it will be recognized that variations or modifications of the disclosed process, including the rearrangement of steps, lie within the scope of the present invention.

The embodiments of the invention in which an exclusive property or privilege is claimed are defined as follows:

1. A method of curing a pickle stock consisting essentially of the steps of:
   (a) immersing the pickle stock in water;
   (b) subjecting the immersed pickle stock to a vacuum treatment for a period of time not exceeding one minute; and
   (c) subjecting the immersed pickle stock to a pressure treatment for a period of time not exceeding one minute.

2. A method of curing a pickle stock consisting essentially of the steps of:
   (a) immersing the pickle stock in a curing liquid containing a sweetener;
   (b) subjecting the immersed pickle stock to a vacuum treatment for a period of time not exceeding one minute; and
   (c) subjecting the immersed pickle stock to a pressure treatment for a period of time not exceeding one minute.

3. A method of curing a pickle stock consisting essentially of the steps of:
   (a) immersing the pickle stock in a curing liquid containing vinegar;
   (b) subjecting the immersed pickle stock to a vacuum treatment for a period of time not exceeding one minute; and
   (c) subjecting the immersed pickle stock to a pressure treatment for a period of time not exceeding one minute.

4. A method of curing pickle stock consisting essentially of the steps of:
   (a) immersing the pickle stock in water;
   (b) subjecting the immersed pickle stock to a vacuum treatment for a period of time not exceeding one minute;
   (c) subjecting the immersed pickle stock to a pressure treatment for a period of time not exceeding one minute; and
   (d) repeating the vacuum treatment.

5. A method of curing pickle stock consisting essentially of the steps of:
   (a) immersing the pickle stock in water;
   (b) subjecting the immersed pickle stock to a vacuum treatment for a period of time not exceeding one minute;
   (c) subjecting the immersed pickle stock to a pressure treatment for a period of time not exceeding one minute; and
   (d) repeating the pressure treatment.

* * * * *